Oct. 11, 1966 C. C. ANDREWS 3,278,001
BEARING ASSEMBLY FOR AUGER CONVEYORS
Filed Feb. 2, 1965
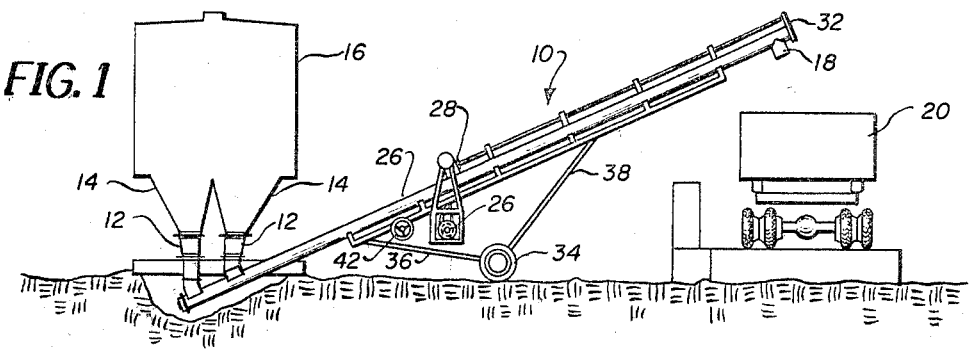
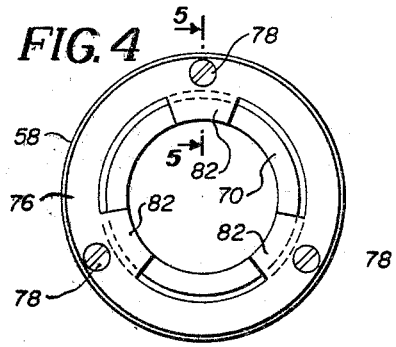
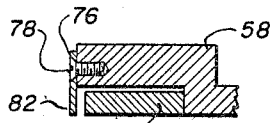
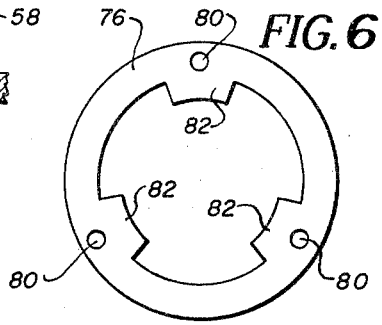
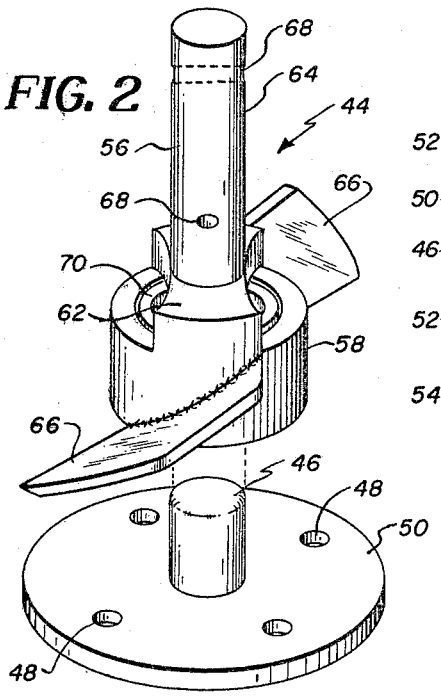
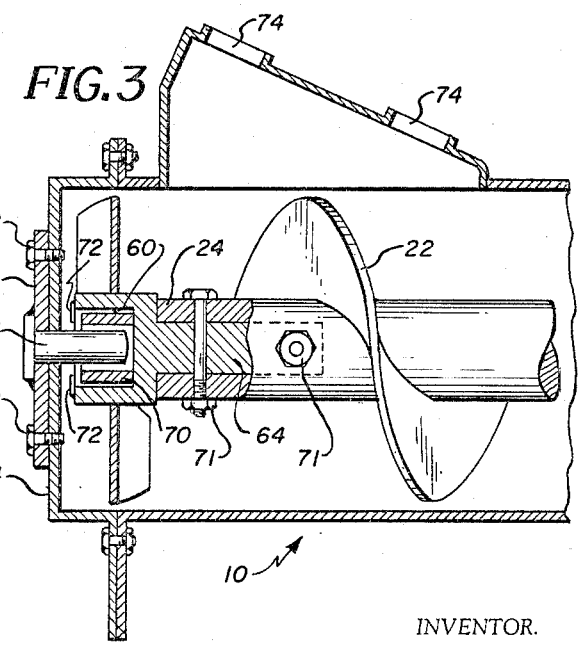
INVENTOR.
CHARLES C. ANDREWS
BY Dominik and Stein
ATTORNEYS

United States Patent Office 3,278,001
Patented Oct. 11, 1966

3,278,001
BEARING ASSEMBLY FOR AUGER CONVEYORS
Charles C. Andrews, 4 S. Sycamore, Villa Grove, Ill.
Filed Feb. 2, 1965, Ser. No. 429,862
7 Claims. (Cl. 198—213)

This invention relates to tubular screw type conveyors and more particularly it relates to an improved bearing construction for conveyors of this type.

Tubular screw type conveyors have been used for some time for conveying and elevating small granular, pulverized, non-abrasive, free-flowing material, such as, grain, cement, fertilizer, stoker coal, salt, rock, phosphate and potash, to mention but a few of the whole host of materials which can be conveyed and elevated. A conveyor of this type which is generally applicable, with little or no modification, for conveying and elevating the aforesaid materials is disclosed in U.S. Patent 2,706,046. The conveyor disclosed therein includes a conveyor screw which is rotatably journalled within an outer tube, by means of a number of spider members and bearings, and it is generally found that the construction is such that it has a relatively long life, and requires little, if any, maintenance.

In the past, a babbit bearing has normally been used to rotatably support the conveyor screw at its input end and it has been found that this bearing is subjected to excessive abuse when conveying and elevating certain types of materials, particularly cement, phosphate, powdered lime and other similar materials. After an extended period of use, the bearing, and hence the conveyor, may be rendered inoperative. It has been determined that the reason for the abnormal abuse of the bearing is due to the fact that the bearing, being a babbit bearing, must be lubricated and when materials of the above described types become mixed with the lubricant, the material becomes abrasive. Being abrasive, the material has a deleterious effect on the bearing. Accordingly, it is an object of this invention to provide a new and improved bearing construction for use in tubular screw type conveyors.

It is a further object to provide a new and improved bearing construction which is particularly applicable for use in the above described environment and which has a relatively long lifetime, comparable to the normally expected useful life of the conveyor per se, before it requires maintenance. In this respect, it is contemplated that the bearing can be easily and inexpensively manufactured.

It is a still further object of the present invention to provide a bearing of the aforesaid type which can be easily and speedily adapted to exist tubular screw type conveyors.

It is a still further object of the invention to provide a bearing of the aforesaid type which does not require lubrication.

Other objects of the invention will in part be obvious and will in part appear hereinafter.

The above defined objectives are accomplished with the bearing construction of the present invention which generally comprises a stud and a sleeve type bearing, the latter of which is freely secured within a rotatably mounted pillow block which has propeller-like blades positioned in flanking and adjacent relationship thereto. The pillow block is formed at one end so as to be slidable into the end of the conveyor screw, and secured thereto by fastener means such as nuts and bolts, while its opposite end is adapted to loosely and freely retain the sleeve bearing therein. The stud is fixedly secured to the input end of the conveyor and is loosely and freely received within the sleeve bearing. In operation, the free flowing material is permitted to flow through, or pass, the sleeve bearing, between the sleeve bearing and the pillow block and also between the sleeve bearing and the stud. The material so passed is conveyed upwardly in the conveyor by the propeller-like blades flanking the pillow block. Some of this material will be picked-up by the conveyor screw and conveyed by it out of the conveyor, and some will again fall free and again pass through the bearing structure. It is found that permitting the material to freely flow within the bearing provides a self-centering action of the shaft of the conveyor screw and the material functions as a lubricant for the bearing in that it retains the bearing elements in spaced relationship so that there is substantially no wear on the bearing elements.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a view illustrating a tubular screw type conveyor which is adapted to convey and elevate the contents of a freight car or the like to a truck and which is of the type in which the bearing of the present invention can be used;

FIGURE 2 is an exploded perspective view of a bearing assembly exemplary of the present invention;

FIGURE 3 is a sectional view of the bearing assembly of FIG. 2 in assembled relationship with the conveyor of FIG. 1;

FIGURE 4 is a bottom plan view of the bearing assembly of FIG. 2, illustrating a modified arrangement for retaining the sleeve bearing within the pillow block;

FIGURE 5 is a sectional view taken along line 5—5 of FIG. 4; and

FIGURE 6 is a view illustrating the retaining ring used to retain the sleeve bearing within the pillow block, as shown in FIG. 4.

Similar reference characters refer to similar parts throughout the several views of the drawing.

Referring now to the drawing, in FIG. 1 is shown a conveyor 10 which is basically of the construction shown in the aforesaid U.S. Patent 2,706,046, modified by the addition of flexible, dust-type canvas connectors 12 securely set in steel frames which are adapted to be secured to the unloading hoppers 14 of a hopper bottom car 16. The material within the car 16 flows through the hoppers 14 and the canvas connectors 12 to the conveyor 10 and are conveyed and elevated thereby and ultimately discharged through its output end 18 into a truck 20 which may be positioned some distance from the car 16, depending upon the over-all length of the conveyor 10.

The conveyor 10, as previously indicated, generally comprises a conveyor screw 22 (which may be best seen in FIG. 3) which has a central tubular shaft 24 which is rotatably journalled within an outer tube 26, by means of a number of spider members and bearings (not shown). The conveyor screw 22 is driven by means of a gasoline, or electric, motor 27 which is operatively coupled to a gear box 28 having a drive shaft 30 extending therefrom to a roller chain and cut-tooth sprocket drive assembly 32 positioned at the top, or output, end of the conveyor. The conveyor 10 is supported by means of a pair of wheels 34, from which extend a first pair of arms 36 which are pivotally and fixedly secured to the conveyor 10 and a second pair of arms 38 which are pivotally and fixedly secured to a roller assembly (not shown) retained within a roller track 40 in a fashion such that upon operation of the winch 42 the conveyor 10 may be raised or lowered. Reference may be had to the above mentioned U.S. Patent 2,706,046 for a complete description of the structure and operation of the conveyor 10.

As previously indicated, the conveyor 10 may be used to convey and elevate granular, pulverized, non-abrasive, free-flowing materials, but that it has been recently determined that the bearing which rotatably supports the conveyor screw 22 at its input end is subject to excessive abuse when conveying and elevating cement and similar materials. To circumvent this deleterious effect which cement and similar materials exert upon the bearing, a bearing 44, as shown in FIG. 2, is provided. For extended, maintenance free service, the bearing 44 is preferably manufactured or fabricated of what is commonly referred to as National Emergency 8620 steel, or its equivalent, and is heat treated. The bearing 44, as may be best seen in FIGS. 2 and 3, has a solid cylindrical shaped stud 46 which is fixedly and rigidly secured to an end fastening plate 48 which may be circular in shape, as shown, and which has a number of apertures 50 formed therein for receiving threaded bolts 52 for securing the plate 48 and the stud 46 to the end wall 54 of the conveyor 10, as shown in FIG. 3.

A pillow block 56 has an enlarged circular shaped end portion 58 which has a bearing retaining cavity 60 centrally formed therein and a portion of its top wall 62 substantially removed on opposite sides of a shaft 64 integrally formed therewith and extending therefrom. A pair of propeller-like blades 66 are preferably fixedly and rigidly secured to the opposite sides of the end portion 58 of the pillow block 56, for reasons to be explained. The shaft 64 has a diameter which substantially corresponds in size with the interior diameter of the central shaft 24 of the conveyor screw 22 and has a pair of apertures 68 formed therein so that it may be slidably received within the central shaft 24 and fixedly secured thereto by means of fastening means, such as the nut and bolt assemblies 71 pass through the apertures 68 and corresponding apertures in the central shaft 24, as shown in FIG. 3.

A sleeve bearing 70 is freely retained within the bearing retaining cavity 60 by means of, according to a first embodiment of the invention, arcuate shaped keys 72 (two of which may be seen in FIG. 3) which are fixedly secured, as by welding, for example, to the lower end of the end portion 58, as shown in FIG. 3. The outer diameter of the sleeve bearing 70 is substantially smaller than the diameter of the bearing retaining cavity 60 and the inner diameter of the sleeve bearing 70 is substantially larger than the diameter of the stud 46 so that the stud 46 is loosely received within the sleeve bearing 70 and the sleeve bearing 70 is likewise loosely received within the bearing retaining cavity 60, for reasons to be explained more fully hereinafter.

In operation, the material within the car 16 flows through the hoppers 14 and through the input ports 74 (FIG. 3) to the interior of the conveyor 10 where it is picked up by the conveyor screw 22 and forced therethrough, in the manner well known in the art. It may be noted, in FIG. 3, that some of the material will fall to the bottom of the conveyor 10 and will not be picked up by the conveyor screw 22.

Since the top wall 62 of the end portion 58 of the pillow block 56 is cut away, this material will flow downwardly between the walls of the bearing retaining cavity 60 and the sleeve bearing 70 and also between the sleeve bearing 70 and the stud 46 to the bottom of the conveyor 10. It is found that the material flowing through these spacings in this fashion functions to maintain the sleeve bearing 70 in spaced relation to the walls of the bearing retaining cavity 60 and in spaced relation to the stud 46 and hence acts as a lubricant for the bearing assembly. Also, it is found that the material flows therethrough in a fashion such that the central shaft 24 of the conveyor screw 22 assumes a centrally positioned alignment within the outer tube 26 of the conveyor 10 without the need of additional shaft aligning means, even though the central shaft 24 thereof is loosely retained by the bearing assembly 44. The propeller-like blades 66 are advantageously provided to pick this material up, in substantially the same manner as the conveyor screw 22, and push it upwardly within the conveyor 10 to, in essence, provide a continuous flow of material through the spacings between the bearing retaining cavity 60, the sleeve bearing 70 and the stud 46.

The bearing assembly 44 need not be lubricated since the material flowing therethrough functions as a self-lubricant when the conveyor is in operation. With this arrangement, the above described deleterious effect on the bearing, by cement and similar material, is virtually, if not entirely, eliminated. The useful life of the bearing assembly 44 is comparable to the useful life of the other elements of the conveyor 10, hence the conveyor 10 may be used to convey and elevate cement and similar material for prolonged periods of time, without having to repair or replace the bearings, as normally required with the bearing previously used to support the central shaft 24 of the conveyor screw 22 at the input end of the conveyor 10.

In FIGS. 4, 5 and 6 is illustrated a second manner in which the sleeve bearing 70 can be retained within the bearing retaining cavity 60. In accordance with this embodiment of the invention, a retaining ring 76 (FIG. 6) which has an outer diameter which corresponds to the outer diameter of the end portion 58 of the pillow block 56 is fixedly secured to the lower end of the end portion 58 by means of fastener means, such as threaded screws 78, passed through apertures 80 formed therein and retained within correspondingly positioned apertures formed in the end portion 58. The central portion of the retaining ring 76 is cut away so that the bearing retaining cavity 60 is unobstructed, with the exception of a number of inwardly projecting tabs 82 which are arranged to extend over the opening of the bearing retaining cavity 60 so as to freely retain the sleeve bearing 70 therein, as shown in FIG. 5. With this arrangement the retaining ring 76 may be removed, to remove the sleeve bearing 70 from within the bearing retaining cavity 60, merely by removing the threaded screws 78, rather than having to break the weld, as in the case of the embodiment shown in FIGS. 2 and 3.

As indicated above, the bearing 44 is preferably manufactured or fabricated of what is commonly referred to as National Emergency 8620 steel, or its equivalent, and is heat treated. The heat treating may be advantageously performed by carburizing it in a pot at 1700° F., 1¹⁄₁₆″ depth, cooling it, reheating in an atmosphere of 1550° F. and then quenching it in oil. The resulting physical properties are generally as follows: core tensile 134,000 and yield point 108,000.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A bearing for use in a tubular screw type conveyor comprising a stud portion fixedly secured to a bottom wall of said conveyor, a pillow block having an enlarged end portion and a shaft extending therefrom, said shaft being adapted to be received and secured within a central shaft of the conveyor screw, said end portion having a bearing retaining cavity formed therein and having its top wall partially removed to permit material being conveyed and elevated by said conveyor to flow therethrough into said cavity, a sleeve bearing freely retained within said bearing retaining cavity and adapted to receive said stud, said sleeve bearing having an outer diameter substantially smaller than the diameter of said bearing retaining cavity and an inner diameter substantially larger than the diameter of said stud, whereby said material can flow between the wall of said bearing retaining cavity and said sleeve bearing and between said sleeve bearing and said stud.

2. A bearing for use in a tubular screw type conveyor comprising a stud portion fixedly secured to a bottom wall of said conveyor, a pillow block having an enlarged end portion and a shaft extending therefrom, said shaft being adapted to be received and secured within a central shaft of the conveyor screw, said end portion having a bearing retaining cavity formed therein and having its top wall partially removed to permit material being conveyed and elevated by said conveyor to flow therethrough into said cavity, a sleeve bearing freely retained within said bearing retaining cavity and adapted to receive said stud, said sleeve bearing having an outer diameter substantially smaller than the diameter of said bearing retaining cavity and an inner diameter substantially larger than the diameter of said stud, whereby said material can flow between the wall of said bearing retaining cavity and said sleeve bearing and between said sleeve bearing and said stud, and blade means secured to said end portion for conveying said material upwardly within said conveyor to provide, in essence, a continuous flow of material into said cavity.

3. A bearing for use in a tubular screw type conveyor comprising a stud portion fixedly secured to a bottom wall of said conveyor, a pillow block having an enlarged end portion and a shaft integrally formed with said end portion and extending therefrom, said shaft being adapted to be received and secured within a central shaft of the conveyor screw, said shaft being adapted to be received and secured within a central shaft of the conveyor screw said end portion having a bearing retaining cavity formed therein and having its top wall partially removed to permit material being conveyed and elevated by said conveyor to flow therethrough into said cavity, a sleeve bearing within said bearing retaining cavity adapted to receive said stud, said sleeve bearing having an outer diameter substantially smaller than the diameter of said bearing retaining cavity and an inner diameter substantially larger than the diameter of said stud, whereby said material can flow between the wall of said bearing retaining cavity and said sleeve bearing and between said sleeve bearing and said stud, and retaining means fixedly secured to said end portion adapted to freely retain said sleeve bearing within said bearing retaining cavity.

4. A bearing for use in a tubular screw type conveyor comprising a retaining plate means adapted to be secured to a bottom wall of said conveyor, a stud fixedly secured to said plate means, a pillow block having an enlarged end portion and a shaft integrally formed therewith and extending therefrom, said shaft being adapted to be received and secured within a central shaft of the conveyor screw, said end portion having a bearing retaining cavity formed therein and having its top wall partially removed to permit material being conveyed and elevated by said conveyor to flow therethrough into said cavity, a sleeve bearing freely retained within said bearing retaining cavity and adapted to receive said stud, said sleeve bearing having an outer diameter substantially smaller than the diameter of said bearing retaining cavity and an inner diameter substantially larger than the diameter of said stud, whereby said material can flow between the wall of said bearing retaining cavity and said sleeve bearing and between said sleeve bearing and said stud.

5. A bearing for use in a tubular screw type conveyor comprising a retaining plate means adapted to be secured to a bottom wall of said conveyor, a stud fixedly secured to said plate means, a pillow block having an enlarged end portion and a shaft integrally formed therewith and extending therefrom, said shaft being adapted to be received and secured within a central shaft of the conveyor screw, said end portion having a bearing retaining cavity formed therein and having its top wall partially removed to permit material being conveyed and elevated by said conveyor to flow therethrough into said cavity, a sleeve bearing within said bearing retaining cavity adapted to receive said stud, said sleeve bearing having an outer diameter substantially smaller than the diameter of said bearing retaining cavity and an inner diameter substantially larger than the diameter of said stud, whereby said material can flow between the wall of said bearing retaining cavity and said sleeve bearing and between said sleeve bearing and said stud portion, retaining means secured to said end portion adapted to freely retain said sleeve bearing within said bearing retaining cavity, and blade means fixedly secured to said end portion for conveying said material upwardly within said conveyor to provide, in essence, a continuous flow of material into said cavity.

6. A bearing according to claim 5, wherein said retaining means comprises a plurality of key means fixedly secured to said end portion in a fashion such as to extend over the opening of said bearing retaining cavity so as to freely retain said sleeve bearing therein.

7. A bearing according to claim 5, wherein said retaining means comprises a circular retaining plate removably secured to the end of said end portion, said plate having an outer diameter substantially corresponding to the outer diameter of said end portion and a central cutout portion leaving the opening of said bearing retaining cavity unobstructed, with the exception of a plurality of tabs which extend inwardly over said opening to freely retain said sleeve bearing therein.

References Cited by the Examiner

UNITED STATES PATENTS

| | | | |
|---|---|---|---|
| 1,922,023 | 8/1933 | Baer | 198—213 |
| 2,706,046 | 4/1955 | Andrews. | |
| 2,927,682 | 3/1960 | Dorris et al. | 198—213 |
| 3,037,613 | 6/1962 | Harmon | 198—213 |

EVON C. BLUNK, *Primary Examiner.*

R. S. KRISHER, *Assistant Examiner.*